Patented Aug. 12, 1947

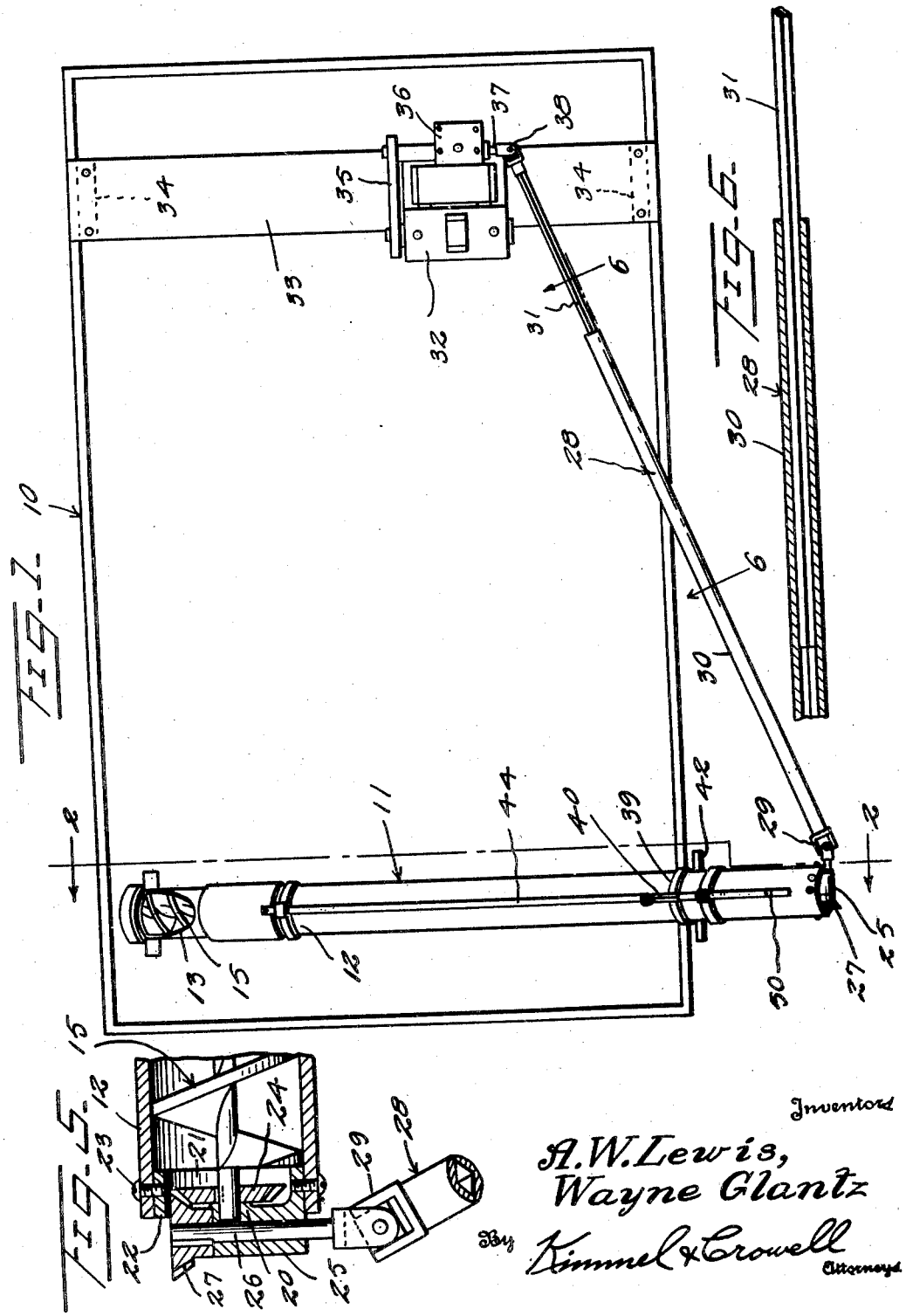

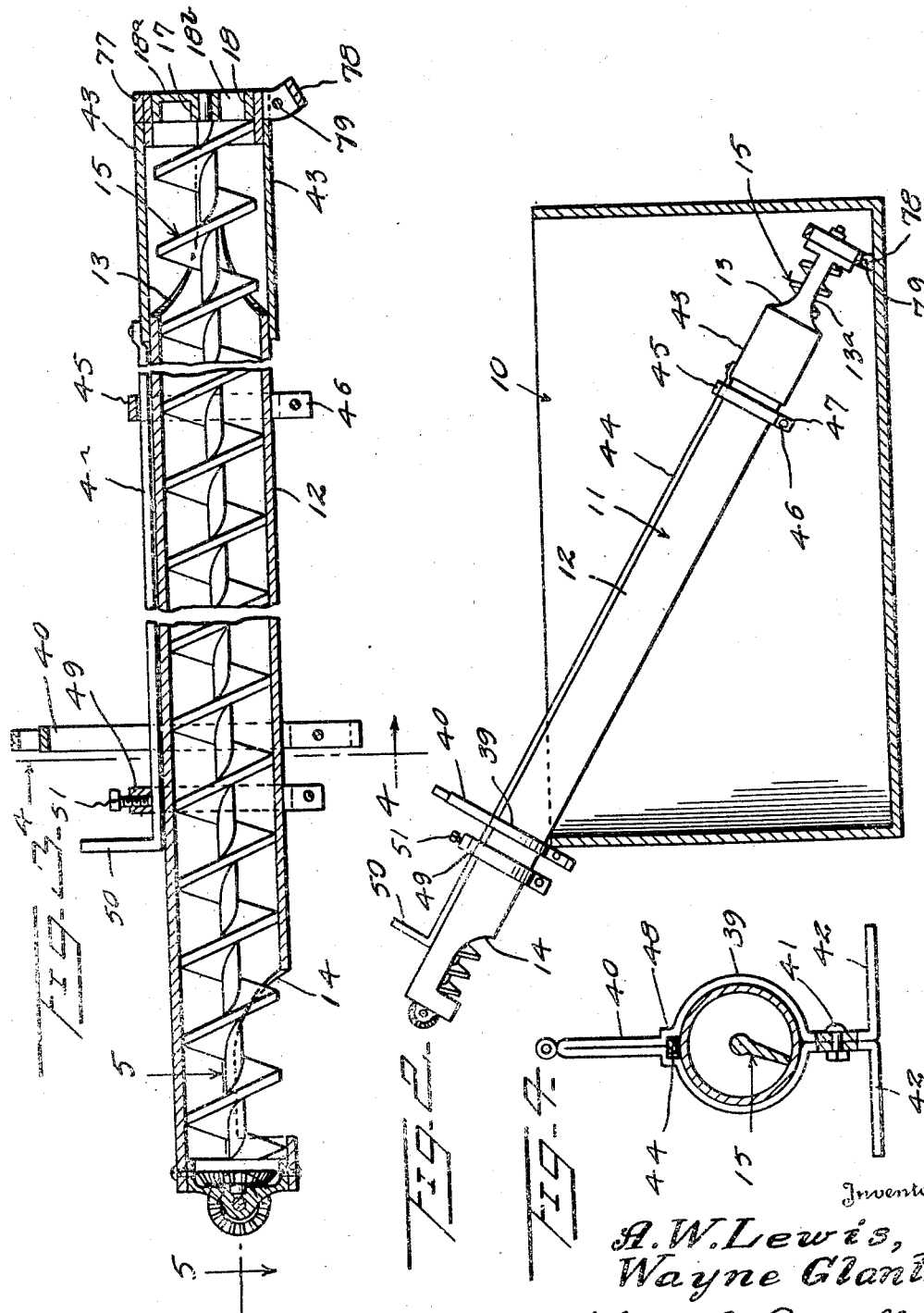

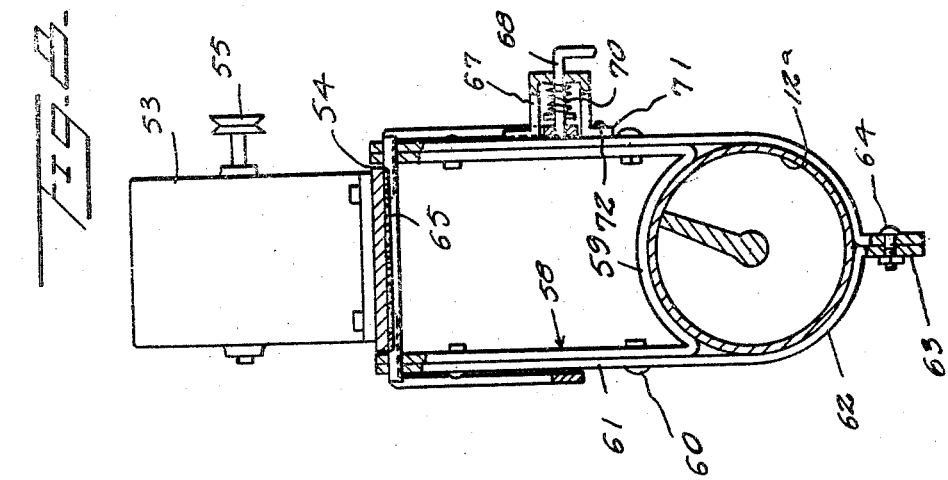
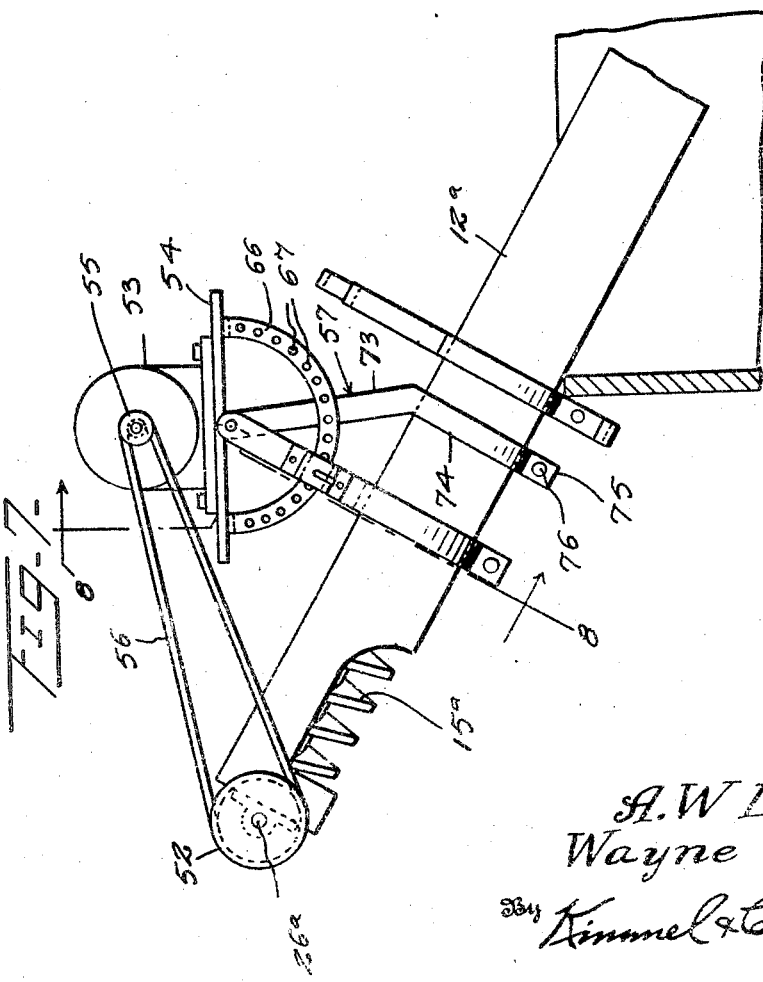

2,425,681

UNITED STATES PATENT OFFICE 2,425,681

PORTABLE SCREW CONVEYOR

Aubrey W. Lewis and Wayne Glantz,
Harvard, Nebr.

Application May 5, 1944, Serial No. 534,309

3 Claims. (Cl. 198—213)

This invention relates to conveyors, and more particularly to a portable conveyor of the screw type.

An object of this invention is to provide a portable screw conveyor which is designed to remove grain or other material from one truck to another, from a truck to a bin or from a bin to a truck, the conveyor including a portable power member so that the unit comprising the conveyor and the power member can be shifted at will.

Another object of this invention is to provide a device of this kind which is simple in construction so that it can be made of sturdy material and can be made light enough in weight so that it can be handled with a minimum of effort.

A further object of this invention is to provide a conveyor of this type having adjustable valve means at the intake end thereof so as to provide for regulation of the quantity of material entering the conveyor.

A further object of this invention is to provide a portable conveyor including a conveyor tube and a power member mounted on the table.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail top plan of a conveyor unit constructed according to an embodiment of this invention;

Figure 2 is a sectional view taken on the line 2—2 of Figure 1;

Figure 3 is a longitudinal section broken away through the screw conveyor;

Figure 4 is a sectional view taken on the line 4—4 of Figure 3; and

Figure 5 is a fragmentary sectional view taken on the line 5—5 of Figure 3;

Figure 6 is a fragmentary longitudinal section taken on the line 6—6 of Figure 1;

Figure 7 is a fragmentary side elevation of a modified form of this invention;

Figure 8 is a sectional view taken on the line 8—8 of Figure 7.

Referring to the drawings, the numeral 10 designates generally a body which may be a truck body or bin within which loose material such as grain or the like is positioned and from which the material is to be removed. A conveyor generally designated as 11 is extended at one end into the body 10 and has the intake end thereof positioned in the lower portion of the body 10 so that the material in the body will gravitate into the intake end of the conveyor and be conveyed upwardly and outwardly of the body.

The conveyor 11 comprises an elongated tubular member 12 which is open at each end and which is provided at a point inwardly from one end thereof with a pair of opposed intake openings 13 and 13ª. The tubular member 12 adjacent the opposite end thereof is formed with a discharge opening 14. A screw conveyor 15 is rotatably mounted within the tubular member 12 and includes a shaft 16 which is journalled in a bearing 17 carried by a support 18. The support 18 is secured as by fastening members 19 in the intake end of the tubular member 12, and the upper half of the support 18 is closed by a wall 18ª forming an end intake opening 18ᵇ, and the opposite end of the conveyor 15 has the shaft 16 thereof journalled in a bearing 20 carried by a spider 21. The spider 21 includes a ring 22 which is secured by fastening members 23 to the opposite end of the tubular member 12 and a bevel gear 24 is secured to the shaft 16 adjacent the bearing 20.

A boss or bearing 25 is formed integral with the spider 21 and projects outwardly of the adjacent end of the tubular member 12 and has rotatably mounted therein a stub shaft 26. The stub shaft 26 has secured thereto a bevel gear 27 which meshes with the bevel gear 24, so that rotation of the stub shaft 26 will effect rotation of the conveyor 15. An extensible conveyor drive shaft generally designated as 28 is connected to the stub shaft 26 by means of a universal joint 29 of conventional construction. The drive shaft 28 includes an elongated tubular shaft 30 having slidable therein a second shaft 31, the latter shaft being polygonal in transverse section so that the two shaft members 30 and 31 will be held against rotation relative to each other but may be extended or contracted as may be desired to provide for the desired positioning of the discharge end of the conveyor 11. A power member 32, in the form of a small internal combustion engine or motor, is mounted on a supporting member 33 which is adapted to engage on the upper edge of the body 10. The power member 32 may be secured in any suitable manner to the supporting member 33 and the latter may have a pair of cleats 34 secured to the lower side thereof so that the supporting member 33 may be shifted lengthwise of the body 10 but will be held against lateral movement with respect thereto. The power member 32 includes a reduction means 35 and a transmission 36 formed with a shaft 37. The shaft 37 is coupled to the shaft member 31 by means of a conventional universal joint 38. In order to provide a means whereby the conveyor 11 may be readily shifted within the body 10 and so that the tubular member 12 may be held against rotation, I have provided a band 39 which engages about the tubular member 12 and is provided with an arm 40 extending radially therefrom. The band 39 is preferably split, as shown in Figure 4, and has the open portion thereof clamped together by means of a fastening member 41. The band 39 is also provided with aligned arms 42 so that, in certain instances, the arms 42 may engage a horizontal support so as to support the tubular member 12 and also hold this member against rotation, and in the proper position for receiving the material at the intake end thereof and discharging the material from the discharge end. As shown in Figures 1 and 2, the clamping band 39 is disposed adjacent one edge of the body 10 and exteriorly of the body, so that the tubular member 12 may be readily shifted from a point outside of the body 10 during the operating of the conveyor.

In order to provide a means whereby the quantity of material entering the intake openings 13 and 13ª may be regulated, I have provided a cylindrical valve 43 which is slidable on the tube 12. The valve 43 is of a length such that it may cover the two openings 13 and 13ª when in closed position. The valve 43 has secured thereto one end of an elongated valve operating rod 44 which is slidable on the periphery of tube 12 and slidably engages through a lower guide 45, in the form of a band which is provided with ears 46 clamped together by means of a fastening member 47. The band 39 is also formed with a guide 48, and an upper guide 49 in the form of a circular split band is secured about the tube 12, and the upper end of the rod 44 is formed with an angularly disposed handle 50. The guide 49 has threaded therethrough, a rod or bar clamping screw 51 so that the valve member 43 may be firmly held in any adjusted position.

Referring now to Figures 7 and 8, there is disclosed a modified form of this invention including a conveyor tube 12ª similar to the tube 12 having a screw conveyor 15ª rotatably mounted therein. The conveyor 15ª is operated by a shaft 26ª similar to shaft 26 with the exception that the shaft 26ª has secured thereto a grooved pulley 52. A power member 53 is mounted on an adjustable platform or base 54 and includes a grooved driving pulley 55 about which an endless belt 56 is trained.

The platform or base 54 is supported from the tube 12ª by means of a supporting structure generally designated as 57. The supporting structure 57 includes a U-shaped member 58 which has an upwardly arched bight. The U-shaped member 58 is secured by fastening members 60 to a pair of outwardly extending supporting arms 61. The supporting arms 61 are provided with curved lower end portions 62 engaging about the lower portion of the tube 12ª and the arms 61 are also formed with opposed ears 63 clamped together by a fastening member 64.

A shaft 65 is secured to the bottom of the base or platform 54, and is journalled through the upper ends of the arms 61 and the legs of the U-shaped member 58. The base or platform 54 has secured thereto a semi-circular bar 66 having a plurality of openings 67. A latching pin 68 which is carried by a U-shaped bracket 69 secured to one of the arms of 61, is adapted to engage in a selected one of the openings 67 so as to position the base or platform 54 in a substantially horizontal position and permit the tube 12ª to be inclined to the vertical. The latching pin 68 is constantly urged inwardly toward a latching position by means of a spring 70. The U-shaped member 69 is formed with outwardly extending ears 71 secured by fastening members 72 to the outer side of one of the arms 61.

The pair of upwardly extending bracing arms 73 are engaged with the shaft or pivot member 65 and are provided with curved lower portions 74 terminating in ears 75 which are clamped together by means of a fastening member 76. The arms 73 extend upwardly in the direction of the shaft 65 with the clamping members 74 spaced from the clamping members 62. The power member 53 may either be an electric motor or a small internal combustion engine. In practice, the conveyor structure shown in Figures 7 and 8 is designed as a small unit, and by having the power member mounted directly on the conveyor tube 12ª, the unit is a very compact unit.

In the use and operation of this invention the power member 32 which is secured to the supporting member 33 is mounted on the upper edge of the body 10 and shifted to the desired position. The conveyor 11 is then projected downwardly into the body 10, and initially the valve 43 may be closed so that the material will only be drawn into the tube 12 through the end intake opening 18ᵇ. This will cause the screw conveyor 15 to pull its way downwardly into the material until the lower end thereof engages the bottom of the body 10. The lower end of the tube 12 is held out of contact with the bottom of the body 10 by means of a band 77 formed with out-turned supporting feet 78. The band 77 is clamped about the end of the tube 12 by means of a clamping bolt 79. After the tube 12 is substantially at the bottom of the body 10, valve 43 may be moved upwardly to the desired open position by loosening clamping screw 51 and pulling handle 50 upwardly and lengthwise of the tube 12.

Operation of the power member 32 will effect rotation of the shaft 28 and conveyor 15 will be rotated through the gears 27 and 24. As the screw conveyor 15 rotates, the material will be drawn from intake openings 13, 13ª, and 18ᵇ and moved lengthwise of the tubular member 12, until the material reaches the discharge opening 14, whereupon the material will be discharged exteriorly of the body 10.

It will, of course, be understood that a truck or other receptacle will be positioned adjacent the discharge opening 14 so as to receive the material as it is being drawn from the body 10. Through the medium of the universal couplings 29 and 38 the conveyor 11 may be readily shifted to any angular position with respect to the shaft 28 and so that substantially all of the material in the body 10 may be removed therefrom.

This device is of a portable construction and is designed to provide for the removal of grain or other material from one body to another. In practice, the device may be used to remove grain from a truck body to a bin or second truck body, or may be used to remove grain from a bin to a truck body. The device is of such construction that it will not require any attachments to mount the device on either a bin or truck body, and when the desired amount of material has been discharged into the receiving element, the unit may be shifted to another body for removing or discharging the material from or to the desired body. The provision of the extensible drive shaft provides necessary flexibility in shifting the conveyor within the body from which the material is being removed, and also provides the necessary flexibility so that the discharge end of the conveyor may be properly positioned, and may also be shifted during the operation thereof to properly fill the receiving body.

What is claimed is:

1. A portable conveyor unit comprising a tubular member having an adjustable intake opening adjacent one end and a discharge opening adjacent the opposite end, a screw conveyor in said member, a power member, means supporting said power member on said tubular member, and a driving connection between said power member and said conveyor, said supporting means including a pair of clamping members attached around said tubular member having arms extending above said tubular member, a U-shaped member above said tubular member attached to the arms of one said clamping members, a base comprising a semicircular bar depending therefrom, a shaft engaging the ends of the extending arms of the clamping members, the arms of the U-shaped member, and said base, for rockably mounting said base, and correlated means carried by one of said clamping members and said semicircular bar for securing said base in selected angular position relative to said tubular member.

2. A portable conveyor unit comprising a tubular member having an adjustable intake opening and a discharge opening, a screw conveyor in said member, a power member, a driving connection between said power member and said conveyor, means supporting said power member on said tubular member, said means including a base attached to said power member, a semi-circular bar attached to said base, spaced openings in said bar, a shaft attached to said base, a pair of clamps attached around said tubular member and having arms extending above said tubular member, openings at the ends of said extending arms loosely carrying said shaft for rockably mounting said base, and means for locking said bar in a selected position.

3. A portable conveyor unit as set forth in claim 2 wherein said latter means includes a housing attached to one of said arms, a pin engaging through said housing and the openings in said semicircular bar, and a spring for constantly urging said pin into engagement with said bar.

AUBREY W. LEWIS.
WAYNE GLANTZ.

REFERENCES CITED

The following references are of record in the file of this patent:

UNITED STATES PATENTS

| Number | Name | Date |
|---|---|---|
| 632,595 | Stein | Sept. 5, 1899 |
| 1,735,920 | Fitzhugh | Nov. 19, 1929 |
| 2,223,894 | Love | Dec. 3, 1940 |
| 2,290,039 | Ford | July 14, 1942 |
| 2,302,840 | Chartrand | Nov. 24, 1942 |
| 2,332,729 | Klosterman | Oct. 26, 1943 |
| 2,355,711 | Dolyniuk | Aug. 15, 1944 |